(12) United States Patent
Jackson et al.

(10) Patent No.: US 6,468,583 B1
(45) Date of Patent: Oct. 22, 2002

(54) TRACKING-RESISTANT, ELECTRICAL-INSULATING MATERIAL CONTAINING SILANE-MODIFIED POLYOLEFINS

(75) Inventors: Peter Jackson, Rexdale (CA); Marcus P. Heydrich, Rexdale (CA)

(73) Assignee: ShawCor Ltd., Toronto (CA)

( * ) Notice: Subject to any disclaimer, the term of this patent is extended or adjusted under 35 U.S.C. 154(b) by 14 days.

(21) Appl. No.: 09/688,825

(22) Filed: Oct. 17, 2000

(30) Foreign Application Priority Data

Nov. 24, 1999 (CA) .............................................. 2290317

(51) Int. Cl.$^7$ ................................................. B05D 5/12
(52) U.S. Cl. ................. 427/117; 264/210.6; 264/210.1; 428/447; 524/323; 524/430; 524/436; 524/268; 526/279; 528/17; 528/18; 528/24
(58) Field of Search ............................ 526/279; 528/17, 528/18, 24; 525/105, 106; 524/323, 430, 436, 267, 268; 264/210.1, 210.5, 210.7, 210.6; 427/117

(56) References Cited

U.S. PATENT DOCUMENTS

| | | |
|---|---|---|
| 3,646,155 A | 2/1972 | Scott |
| 4,058,583 A | 11/1977 | Glander et al. |
| 4,228,255 A | 10/1980 | Fujimoto et al. |
| 4,329,536 A | 5/1982 | Sato et al. |
| 4,529,750 A | 7/1985 | Gimpel |
| 4,549,041 A | 10/1985 | Shingo et al. |
| 4,680,319 A | 7/1987 | Gimpel et al. |
| 4,732,939 A | 3/1988 | Hoshi et al. |
| 4,870,136 A | 9/1989 | Yagi et al. |
| 4,902,460 A | 2/1990 | Yagi et al. |
| 4,921,916 A | 5/1990 | Howell et al. |
| 5,002,996 A | 3/1991 | Okuda et al. |
| 5,237,014 A | 8/1993 | Barnabeo |
| 5,367,030 A | 11/1994 | Gau et al. |
| 5,384,369 A | 1/1995 | Brosius et al. |
| 5,430,091 A | 7/1995 | Mahabir |
| 5,492,760 A | 2/1996 | Sarma et al. |
| 5,756,023 A | 5/1998 | Stachowiak |
| 5,773,145 A | 6/1998 | Inoue et al. |
| 5,824,718 A | 10/1998 | Penfold et al. |
| 5,837,939 A | 11/1998 | Cieloszyk et al. |
| 5,919,565 A | 7/1999 | Gross |
| 6,043,306 A | * 3/2000 | Imahashi |

FOREIGN PATENT DOCUMENTS

| | | |
|---|---|---|
| EP | 0 575 111 A | 12/1993 |
| GB | 2 093 760 A | 9/1982 |
| GB | 2 172 895 A | 10/1986 |
| JP | 53-021248 A | * 2/1978 |
| JP | 6-335967 A | * 12/1994 |
| JP | 7-330979 A | * 12/1995 |
| JP | 10-245456 A | * 9/1998 |
| WO | WO 98 23687 A | 6/1998 |

* cited by examiner

*Primary Examiner*—Robert Dawson
*Assistant Examiner*—Marc S. Zimmer
(74) *Attorney, Agent, or Firm*—Ridout & Maybee LLP

(57) ABSTRACT

A tracking resistant electrical insulating material or article suitable for medium to high voltage applications comprising a silane-modified polyolefin, and a heat-shrinkable article prepared therefrom. Said material or article is preferably prepared by a process comprising: (a) reacting polyolefin with a silane in the presence of a free-radical initiator to form a silane-grafted polyolefin, or copolymerising a polyolefin with silane; (b) preparing a mixture of one or more silane-modified polyolefins prepared in (a) with optionally one or more non silane-modified polyolefins, antitrack ingredients, and a silanol condensation catalyst; (c) forming the insulating material or article by melt extruding or moulding said mixture; and (d) crosslinking the insulating material or article by exposing it to moisture, preferably at elevated temperature. The silane-modified, moisture-crosslinkable polyolefin provides the insulating material with high resistance to tracking even in the absence of conventional anti-tracking fillers.

30 Claims, No Drawings

TRACKING-RESISTANT, ELECTRICAL-INSULATING MATERIAL CONTAINING SILANE-MODIFIED POLYOLEFINS

FIELD OF THE INVENTION

The present invention relates to polymeric materials for insulating electrical equipment and providing resistance to tracking, and more particularly to such materials comprising silane-modified, moisture crosslinkable resins which are suitable for medium to high voltage insulation applications, including heat-shrinkable articles used therefor.

BACKGROUND OF THE INVENTION

Polymeric materials based on polyolefins are commonly used for insulating electrical equipment since they have excellent electrical properties such as low dielectric constant and high dielectric strength, coupled with relatively low cost. Due to their semi-crystalline structure, polyolefins also exhibit good mechanical properties and can be readily crosslinked, and are therefore suitable for the manufacture of heat-shrinkable components for use in electrical insulation applications, such as heat-recoverable tubing, sheet, tape or mouldings designed to cover medium and high voltage cable splices, joints, connectors, terminations and bus-bars.

However, the medium and high voltage insulating properties of polymeric materials can be severely compromised in contaminated atmospheric conditions where deposited moisture, together with salts, dust particles, ionic pollution, acid gases and/or ultra-violet radiation reduce the surface resistivity of the insulation, thereby encouraging high leakage currents to flow across the surface of the insulation. These leakage currents may cause a rise in temperature of the polymeric material, causing surface moisture evaporation and the formation of dry solid bands of deposited material on the polymer surface. Electrical discharges or arcing can occur across these bands resulting in the degradation of the insulation and the formation of conductive carbonaceous paths on the surface. Complete failure of the system will occur when these paths propagate to the extent that the remaining insulation can no longer withstand the applied system voltage. This process is known as "tracking".

The formation of permanent conductive paths on the surface of the polymeric insulating materials has led to the development of so called "anti-track" polymeric compounds formulated to resist the process described above. For example, it is known that polymeric insulation materials can be rendered highly resistant to tracking by the use of certain particulate fillers, the most commonly used additives being hydrated metal oxides, such as alumina trihydrate. Other known anti-tracking fillers include magnesium hydroxide and aluminum silicate. Also, certain polymers, such as silicone elastomers are also known to impart anti-track properties.

In addition, it is beneficial to incorporate hydrophobic additives that prevent "wetting" of the polymer surface and the attachment of moisture and other undesirable contaminants that may promote tracking. Such additives are chosen to have low surface energy and include low molecular weight silicone and fluorine-based chemicals. It is also desirable to incorporate UV absorbing chemicals and antioxidant stabilisers to resist long term aging and degradation of the surface of the insulation. Examples of UV absorbers include hindered amine derivatives and certain metal oxides, such as ferric oxide. Anti-oxidants typically include hindered phenols, phosphites, and dihydroquinoline-based entities. Additional additives may include process aids, such as fatty acids and polyethylene waxes, and colorants such as ferric oxide. These additives can be incorporated into the base polymer by standard methods of melt mixing and compounding, for example using a twin-screw continuous compounder or internal batch mixing device.

Crosslinking of an insulating material as formulated above is usually necessary in the wire and cable industry to impart temperature resistance, and prevent softening and deformation of the insulation at high service temperatures. For heat-shrinkable insulations, crosslinking is also used to impart heat-recovery characteristics to the material so that it may be used to cover individual wire and cable splices, joints and terminations by applying heat to the previously crosslinked and stretched material. Crosslinking may be accomplished by the use of organic peroxides or electron beam radiation. These are commonly used techniques in the wire and cable industry. but are disadvantageous in that both processes require very large capital investment. Crosslinking by moisture using silane-modified polyolefins offers significant cost advantages over the other two methods, through this process has not previously been considered for the crosslinking of anti-track materials.

Polymeric materials used for medium and high voltage applications may also be degraded by the process known as "treeing". Not to be confused with tracking, which is a surface phenomenon, treeing is the formation and propagation of micro voids within the material due to partial discharges caused by the presence of internal moisture and impurities, coupled with electrical stress. These internal voids may gradually grow to such an extent that they ultimately reduce the integrity of the solid insulation sufficient to cause premature dielectric breakdown of the system. The cause and propagation of "trees" is a distinct phenomenon and unrelated to surface tracking.

SUMMARY OF THE INVENTION

The present invention overcomes at least some of the above-discussed problems of the prior art by providing a tracking-resistant, electrical insulating material suitable for high voltage applications comprising silane-modified, moisture-crosslinkable polyolefin materials.

The silane-modified polyolefin may be prepared either by a process of grafting a vinyl silane onto an olefin homopolymer or copolymer as is described in U.S. Pat. No. 3,646,155, or, alternatively, by copolymerising the vinyl silane directly with the polyolefin as is described in U.S. Pat. No. 4,413,066, for example.

The inventors have surprisingly found that silane-modified, moisture-crosslinkable polymers, in particular, silane-grafted, moisture-crosslinkable polyolefins possess high resistance to tracking, even in the absence of conventional anti-tracking fillers such as alumina trihydrate, or other additives known to impart antitrack properties.

In the present invention, one or more silane-modified polyolefins, preferably silane-modified polyethylenes or copolymers of polyethylene, are optionally blended with one or more non silane-modified polyolefins, and other suitable additives, to produce a tracking-resistant material.

Suitable polyolefins in this invention would include those materials known in the industry as low density polyethylene, high density polyethylene, linear low density polyethylene; copolymers of polyethylene, including those based on ethylene-butene, ethylene-hexene, ethylene-octene, ethylene-vinyl-acetate, ethylene-methyl-acrylate, ethylene-ethyl-acrylate, ethylene-butyl-acrylate, and similar materials; and ethylene-propylene or ethylene-propylene diene elastomers; and, in particular those of the above prepared using so-called metallocene catalysts. Additionally, the non silane-modified polymer may not necessarily be restricted to polyolefins, but may include other suitable polymers, such as silicone elastomers and fluoropolymers which are known to resist tracking.

The blended composition is then formed into the desired article by melt processing techniques, such as extrusion and moulding. The article thus formed is then crosslinked in the presence of a silanol condensation catalyst under suitable conditions of moisture, preferably in the presence of heat, the catalyst being either blended with the composition during melt processing or added subsequent to melt processing by surface coating the article.

Accordingly, the present invention provides an electrical insulating material suitable for high voltage applications which is resistant to tracking and spark erosion, comprising a silane-modified, preferably silane-grafted, moisture-crosslinked polymeric material formed by a process comprising: (a) reacting polyolefin with a silane to form a silane-grafted resin or silane-olefin copolymer; (b) producing a mixture of the silane-modified polyolefin, and optionally one or more non silane-modified polyolefins and/or suitable additives, and a silanol condensation catalyst; (c) forming the insulating material by melt extruding the mixture formed in step (b); and (c) crosslinking the insulating material by exposing it to moisture, preferably at elevated temperature.

DETAILED DESCRIPTION OF PREFERRED EMBODIMENTS

The crosslinking of polymers, in particular polyolefins, by the combined process of chemical grafting of silane molecules onto the polymer to form a silane-grafted resin (also referred to herein as a "silane-modified polyolefin"), followed by catalysed hydrolysis and condensation of the silane, is a well known and established process such as is described in U.S. Pat. No. 3,646,155, which is incorporated herein by reference in its entirety.

The preferred polyolefins for use in the compositions of the present invention include polyethylene or co-polymers of ethylene prepared by polymerising ethylene with one or more of an unsaturated olefin monomer having from 3 to 20 carbon atoms, preferably propylene, butylene, hexene or octene, a substituted olefin such as vinyl acetate, ethyl acrylate, methyl acrylate or butyl acrylate, or a diene monomer, such as methylene norbornene. Preferred polyolefins also include ethylene-propylene elastomers and ethylene-propylene diene elastomers and those polymerised using so-called metallocene catalysts. Preferably, the polyolefin resin comprises about 50 to 100% by weight ethylene, more preferably about 60 to 90% by weight ethylene, and most preferably about 80 to 95% by weight ethylene.

Preferably, the density of the polyethylene or the ethylene co-polymer is in the range of about 0.85 to about 0.95 g/cm$^3$, and more preferably from about 0.88 to about 0.94 g/cm$^3$.

The polymer as described above is reacted in the molten state with an organic silane having the general formula RR'SiY$_2$, wherein R represents a monovalent olefinically unsaturated hydrocarbon or hydrocarbonoxy radical, Y represents a hydrolysable organic radical and R' represents an R radical or a Y radical. The monovalent olefinically unsaturated hydrocarbon radical preferably comprises vinyl, allyl, butenyl, cyclohexenyl, cyclopentadienyl, or cyclohexadienyl radicals.

The group Y may represent any hydrolysable organic radical, for example an alkoxy radical such as methoxy, ethoxy and butoxy radicals; an acyloxy radical, for example the formyloxy, acetoxy or propionoxy radicals; oximo radicals such as —ON=C(CH$_3$)$_2$, —ON=CCH$_3$C$_2$H$_5$ and ON=C(C$_6$H$_5$)$_2$; or substituted amino radicals such as alkylamino and arylamino radicals, examples of which are —NHCH$_3$, —NHC$_2$H$_5$ and —NH(C$_6$H$_5$)$_2$.

Preferably, the silane has general formula RSiY$_3$, with the most preferred group R being the vinyl radical, and the most preferred Y groups being the methoxy and ethoxy radicals. Accordingly, the most preferred silanes for use in the present invention are vinyltriethoxysilane and vinyltrimethoxysilane.

The amount of silane reacted with the polymer depends in part upon the reaction conditions and the degree of modification desired in the polyolefin. The proportion may vary from about 0.1 to about 10% by weight based on the total weight of the silane-modified polyolefin, more preferably from about 0.5 to 5% by weight, even more preferably from about 0.5 to 2.5% by weight, and most preferably from about 1.0 to 2.5% by weight.

A free-radical initiator is also incorporated into the resin to initiate the graft polymerization reaction. Most preferred free-radical initiators are organic peroxides such as benzoyl peroxide, dichlorobenzoyl peroxide, dicumyl peroxide, di-tertiarybutyl peroxide. The most preferred free-radical initiator for use in the compositions of the present invention is dicumyl peroxide. The criteria for choosing an appropriate free-radical initiator are known to persons skilled in the art and are described in the above-mentioned U.S. Pat. No. 3,646,155 and will not be repeated here.

Preferably, the organic peroxide free-radical initiator is added in an amount of from about 0.1 to about 1.0% by weight of the silane-modified polyolefin, more preferably from about 0.05 to 0.2% by weight.

The silane and peroxide are reacted with the polyolefin above the melting point of the polyolefin under conditions in which the polyolefin is subjected to mechanical working, using processes known to those skilled in the art.

Alternatively, the silane-containing polyolefin may be prepared by copolymerising an unsaturated olefinic monomer, such as ethylene, with an unsaturated silane monomer containing one or more hydrolysable groups, such as vinyltrimethoxysilane, as is disclosed in U.S. Pat. No. 4,413,066, for example.

The silane-modified polyolefin or polyolefins, so produced by either of the above two methods, is subsequently melt-processed with an amount of a silanol condensation catalyst, and optionally with one or more of a number of other ingredients, including one or more non-silane grafted polyolefins and/or suitable additives selected from anti-track fillers, antioxidants, uv stabilisers, anti-wetting agents and processing aids, to form an anti-track material. Preferably, the additional polyolefin(s) has the same composition as the polyolefin(s) used to form the graft polymer with the silane, but may be any suitable polyolefin. In addition, polymers other than polyolefins, such as silicone elastomers, which are miscible with the silane-modified polyolefin, may be used. The additional polyolefin is preferably added in an amount of from about 10 to about 80 percent by weight of the anti-track material, and more preferably from about 20 to about 50 percent by weight.

The silanol condensation catalyst is typically selected from the group comprising organic bases, carboxylic acids and organometallic compounds including organic titanates and complexes or carboxylates of lead, cobalt, iron, nickel, zinc and tin. Preferably, the catalyst is selected from dibutyltin dilaurate, dibutyltin diacetate, dibutyltin octanoate, dioctyltin maleate, dibutyltin oxide and titanium compounds such as titanium-2-ethylhexoxide. The most preferred silanol condensation catalyst is dibutyltin dilaurate, though any material that will catalyse the silane-condensation reaction is suitable for the invention. The condensation catalyst is preferably added in an amount of from about 0.01 to about 1 percent by weight of the coating material, more preferably about 0.05 to about 0.5 percent by weight, and most preferably about 0.1 to 0.2 percent by weight.

Subjecting the anti-track material to moisture, preferably at an elevated temperature, will induce cross-linking of the silane groups via a combined hydrolysis and condensation reaction. Atmospheric moisture is usually sufficient to permit the cross-linking to occur, but the rate of cross-linking may be increased by the use of an artificially moistened atmosphere, or by immersion in liquid water. Also, subjecting the composition to combined heat and moisture will accelerate the reaction. Most preferably, cross-linking is effected at a temperature above 50° C. and most preferably by exposing the composition to a temperature of 85° C. and a relative humidity of 90% for approximately 100 hours.

A particularly preferred process for forming an anti-track material of the present invention will now be described below.

The polyolefin, silane, free-radical initiator and optional processing stabiliser are pre-blended and passed through an extruder at a temperature above the melting point of the polyolefin, in order to accomplish grafting of the silane to the polyolefin. The grafted material is then passed through a multi-strand dye into a trough of cooled water and is subsequently chopped into pellets with a strand pelletizer, and then dried.

The grafted polymer pellets are then blended, and melt extruded or moulded to the desired shape, with a quantity of ungrafted resin, preferably comprising a polyolefin as described above. Preferably, the amount of ungrafted resin blended with the grafted polymer pellets is from about 10 to about 70% by weight of the anti-track material. At this point, the silane condensation catalyst is added, as well as any number of optional ingredients. Optional ingredients include conventional anti-track fillers such as inorganic metal oxides, hydroxides or salts, or mixtures thereof Preferred anti-track fillers include alumina trihydrate and aluminum silicate clay. However, it is to be appreciated that the anti-track materials according to the invention have excellent anti-track properties in the absence of anti-track fillers. Anti-track fillers are preferably added in an amount of from about 0 to about 70 percent by weight of the anti-track material, more preferably about 20 to 50 percent by weight. Ferric oxide is preferably also added as a colorant in a small amount, preferably up to about 10 percent by weight of the anti-track material, more preferably about 5 percent by weight. Other minor ingredients which can optionally be added in minor amounts include UV stabilizers, antioxidants, anti-wetting agents and process aids as described previously.

The extruded or moulded material is then exposed to moisture, preferably at an elevated temperature, to effect the desired degree of crosslinking, as described above.

The anti-track properties of the material can be measured by test methods normally applied in the industry, and specifically in accordance with the American Society of Testing and Materials (ASTM) Standard D2303 entitled "Standard Test Method for Liquid-Contaminant, Inclined-Plane Tracking and Erosion of Insulating Materials". This test method, along with similar test methods such as ASTM D2132, "Dust-and-Fog Tracking and Erosion Resistance of Electrical Insulating Materials", provides a means of quantitatively evaluating the relative ability of insulating materials to withstand the action of electrical discharges on the surface of the insulation, which are similar to those which may occur in service under the influence of atmospheric contaminants such as dirt and moisture. In the field, the critical conditions for electrical discharges occur sporadically, and degradation in the form of a conducting "track" develops very slowly until it ultimately bridges the space between the conductors to cause complete electrical breakdown. In ASTM D2303, this is simulated by applying a conducting liquid contaminant at an optimum rate to the surface of a test specimen of the anti-track material so that a continuous electrical discharge is maintained. This provides an accelerated version of field conditions, and the sample will fail within a few hours compared to perhaps many years in actual service.

The actual properties measured in ASTM D2303 are "time-to-track" at a specific constant voltage, and "initial tracking voltage". Time-to-track is defined as the time in which tracking proceeds a specified distance (1 in.) between two test electrodes at a specified voltage (usually 2,500 V). Initial Tracking Voltage is defined as the applied voltage at which continuous tracking can be initiated within a specified time (usually 1 hour). No set pass or fail criteria are provided by ASTM D2303 since it is a comparative test method. However, many years of testing to this standard have provided general benchmarks of performance. In terms of Initial Tracking Voltage, a minimum value of 1,500 V would represent adequate tracking resistance for field application. For the "Time-to-Track" test, a value in excess of about 100 minutes appears to be adequate, though the longer the time, the more track-resistant the material.

The materials produced according to the present invention exceed the above-mentioned minimum values for Initial Tracking Voltage and Time-to-Track. That is, materials according to the invention have a time-to-track as measured by ASTM D2303 of greater than about 100 minutes, preferably greater than about 200 minutes, and more preferably greater than about 300 minutes. Further, materials of the invention have an initial tracking voltage as measured by ASTM D2303 of greater than about 1,500 V, and preferably at least about 2,000 V.

The crosslinked, anti-track material produced as described above exhibits the property of softening but not melting when re-heated above its softening point or crystalline melting point. This is desirable for the manufacture of heat-shrinkable articles since the polymer may be stretched beyond the original extruded or moulded dimensions without rupture using relatively low forces, and can then be frozen in the stretched state by cooling it rapidly to below the melting point. Stretching can be accomplished by mechanical, pneumatic or hydraulic means. At this point the stretched crosslinks are held in a stable state by the re-formed, solid crystalline regions. Subsequent re-heating of the stretched article above the melting point will cause the crystalline regions to re-melt and the structure to revert to its original extruded or moulded dimensions.

The invention is further illustrated by the following Examples:

EXAMPLE 1

This example lists the preferred silane-grafted, moisture-cross-linkable resins according to the present invention.

The following resins were grafted with vinyl triethoxysilane according to the general procedure mentioned above and known to those skilled in the art.

TABLE 1

(Properties of Polyolefin Resins used for Silane Grafting)

| Polymer Type | Copolymer Content (%) | Density (g/cm$^3$) | Melt Index (g/10 min) |
|---|---|---|---|
| Linear Low Density Polyethylene | — | 0.919 | 6.0 |
| Ethylene Octene Copolymer | 14 | 0.902 | 4.3 |
| Ethylene Vinyl Acetate Copolymer | 18 | 0.940 | 8.0 |
| Ethylene Ethyl Acrylate Copolymer | 18 | 0.931 | 6.0 |

EXAMPLE 2

This example describes the production of a preferred electrical insulating material according to the present invention.

The grafted pellets produced according to Example 1 were blended with the ingredients indicated in Table 2 below to produce General Formulations A, B and C. Each of these formulations includes an amount of ungrafted resin which comprises a polyolefin resin having a composition identical to that of Example 1, but without silane. The ungrafted resin was blended with ferric oxide, dibutyltin dilaurate, aluminum silicate clay (B only), and alumina trihydrate, antioxidant, PTFE powder and UV stabiliser (C only) in an internal batch compounding machine, using standard procedures known to those skilled in the art, to produce a pelletized concentrate or masterbatch. The blend of this concentrate and the grafted resin was then fed through a 24:1 L/D single screw extruder at a melt temperature of approximately 120° C. into an annular die. The tubing thus produced was fixed to a predetermined diameter and wall thickness by passing the extrudate through a water-cooled, vacuum sizing chamber and was stored on reels.

The tubing was crosslinked by conditioning the reels at a temperature of 85° C. and a relative humidity of 90% for approximately 100 hours.

The finished tubing was tested for anti-track properties in accordance with ASTM D2303, Standard Test Method for Liquid-Contaminant, Inclined-Plane Tracking and Erosion of Insulating Materials.

TABLE 2

(Moisture-Crosslinkable, Anti-track Materials A to C)

| | Percent by Weight | | |
|---|---|---|---|
| Ingredient | A | B | C |
| Silane-Grafted Resin | 46.5 | 40 | 32.5 |
| Ungrafted Resin* | 46.5 | 25 | 16.2 |
| Alumina Trihydrate | | | 37.3 |
| Aluminum Silicate Clay | | 25 | |
| Ferric Oxide | 2 | 5 | 5 |
| Antioxidant* | | | 2 |
| UV Stabiliser** | | | 1 |
| PTFE Powder | | | 1 |
| Dibutyltin Dilaurate*** | 5 | 5 | 5 |

*Polymerised 1,2-dihydro-2,3,4-trimethylquinoline
**Hindered amine light stabiliser
***Added as a 2% masterbatch in polyethylene

TABLE 3

(Results of Tracking Resistance Test)

| Formulation | Time to Track (min) |
|---|---|
| A | 136 |
| B | 143 |
| C | 313 |

By way of comparison, a radiation crosslinked version of formulation B registered 140 minutes in the Time-to-Track test, indicating that the moisture-crosslinkable formulation is at least as effective in terms of anti-track properties.

EXAMPLE 3

This example describes the production of a heat-shrinkable, anti-track tubing according to the present invention.

The crosslinked tubing produced in Example 2 was stretched to three times the original extruded diameter by a continuous process of internally pressurizing the re-heated tubing with air and passing it through an external forming die. The tubing was fixed in this expanded state by immediately cooling it with water as it exited the die.

The tubing was again tested for anti-track properties in accordance with ASTM D2303, Standard Test Method for Liquid-Contaminant, Inclined-Plane Tracking and Erosion of Insulating Materials.

EXAMPLE 4

This example describes the production and testing of additional preferred electrical insulating materials according to the present invention.

The silane-grafted, moisture-cross-linkable anti-track materials described below were produced according to the methods described in Examples 1, 2 and 3, except that in formulations D and E the ungrafted resin comprises a polyolefin different from that in the silane-grafted resin.

TABLE 4

General Formulations D to F
(Moisture-Crosslinkable, Anti-track Material)

| | Percent by Weight | | |
|---|---|---|---|
| Ingredient | D | E | F |
| Silane-Grafted Resin | 47.5 | 40 | 32.5 |
| Ungrafted Resin | 47.5* | 30* | 16.4 |
| Dibutyltin Dilaurate Concentrate | 5 | 5 | 2 |
| Alumina Trihydrate | | | 37.3 |
| Aluminum Silicate Clay | | 25 | |
| Ferric Oxide | | | 5.2 |
| Antioxidant | | | 3.3 |
| PTFE Powder | | | 1 |
| Cure Promoter | | | 2.3 |

*Low density polyethylene, density 0.919, melt index 2.0.

The above compositions D, E and F were tested for tracking resistance according to test method ASTM D2303. The values for initial tracking voltage (kilovolts) and time to track (minutes) at an applied voltage of 2,500 volts are shown in Table 5 below.

TABLE 5

Results of Tracking Resistance Test

| Formulation | Initial Tracking Voltage (kV) | Time to Track (min.) |
|---|---|---|
| D | 2.2 | not tested |
| E | 2.2 | 405 |
| F | 2.0 | 313 |

By way of comparison, a filled, commercial radiation-crosslinked formulation registered 168 minutes in the time to track test, substantially less than the moisture-crosslinkable formulations according to the present invention containing no filler.

Although the invention has been described in relation to certain preferred embodiments, it will be appreciated that it is not intended to be limited thereto. Rather, the invention is intended to encompass all embodiments which fall within the scope of the following claims.

What is claimed is:

1. A method of protecting electrical equipment from damage due to tracking and spark erosion, comprising:
   (a) forming a mixture comprised of a silane-modified polyolefin with a silanol condensation catalyst, said silane-modified polyolefin comprising either a silane-grafted polyolefin or a silane-olefin copolymer;
   (b) melt extruding or moulding the mixture formed in step (a) to form an article;
   (c) crosslinking the article by exposing it to moisture, preferably at elevated temperature, such that the article is softened but does not melt when heated to a temperature above its softening point;
   (d) applying the article to said electrical equipment so as to form an external, insulating layer on said equipment; and
   (e) exposing said equipment with said insulating layer to electrical and atmospheric conditions conducive to surface tracking.

2. The method according to claim 1, wherein the mixture formed in step (a) further comprises one or more non silane-modified polyolefins.

3. The method according to claim 1, where the article is heat-shrinkable, and the process additionally comprises the following step between steps (c) and (d):
   stretching the article produced in step (c) above its softening or melting point, and then cooling the article so as to freeze it in its stretched form; and
   wherein the step of applying the article to the electrical equipment includes heat shrinking the article onto the electrical equipment.

4. The method according to claim 2, wherein the silane-modified polyolefin and the non-silane modified polyolefin are selected from the group comprising polyethylene and copolymers of ethylene with an olefin having from 3 to 20 carbon atoms.

5. The method according to claim 2, wherein the silane-modified polyolefin and the non-silane modified polyolefin comprise a copolymer of ethylene with one or more of propylene, butylene, hexene, octene, methylene norbornene, vinyl acetate, methyl acrylate, ethyl acrylate and butyl acrylate.

6. The method according to claim 2, wherein the density of the silane-modified polyolefin and the non silane-modified polyolefin is from about 0.85 to about 0.95 g/cm$^3$.

7. The method according to claim 1, wherein the silane-modified polyolefin comprises a polyolefin which has been reacted with a silane of the general formula RR'SiY$_2$ wherein R represents a monovalent olefinically unsaturated hydrocarbon or hydrocarbonoxy radical, Y represents a hydrolysable organic radical and R' represents a monovalent olefinically unsaturated hydrocarbon or hydrocarbonoxy radical or a hydrolysable organic radical.

8. The method according to claim 7, wherein the monovalent olefinically unsaturated hydrocarbon or hydrocarbonoxy radical is selected from the group comprising vinyl, allyl, butenyl, cyclohexenyl, cyclopentadienyl, and cyclohexadienyl.

9. The method according to claim 7, wherein Y represents a hydrolysable organic radical selected from the group comprising methoxy, ethoxy, butoxy, formyloxy, acetoxy, propionoxy; oximo radicals selected from —ON=C(CH$_3$)$_2$, —ON=CCH$_3$C$_2$H$_5$ and ON=C(C$_6$H$_5$)$_2$; or substituted alkylamino or arylamino radicals selected from -NHCH$_3$, —NHC$_2$H$_5$ and —NH(C$_6$H$_5$)$_2$.

10. The method according to claim 7, wherein the silane has general formula RSiY$_3$, with R being vinyl and Y being methoxy or ethoxy.

11. The method according to claim 7, wherein the amount of the silane reacted with the ethylene-based polyolefin is from about 0.5 to about 2.5 percent by weight of the silane-modified polyolefin.

12. The method according to claim 1, wherein a reaction between the polyolefin and the silane is initiated by an organic peroxide free-radical initiator.

13. The method according to claim 2, wherein the non saline-modified polyolefin is added to the mixture of step (a) in an amount of from about 10 to about 70 percent by weight of the article.

14. The method according to claim 1, wherein the silanol condensation catalyst is selected from the group comprising dibutyltin dilaurate and dibutyltin oxide.

15. The method according to claim 1, wherein the silanol condensation catalyst is added to the mixture of step (b) in an amount of about 0.05 to 0.2 percent by weight of the article.

16. The method according to claim 1, wherein said article additionally comprises ingredients selected from one or more members of the group comprising antioxidants, anti-track fillers, colorants, UV stabilizers, process aids, anti-wetting agents and additional polymers.

17. The method according to claim 16, wherein the antioxidants are selected from the group comprising hindered phenols, dihydroquinolines and phosphites.

18. The method according to claim 16, wherein the anti-track filler is alumina trihydrate.

19. The method according to claim 16, wherein the colorant is ferric oxide.

20. The method according to claim 16, wherein the process aid or anti-wetting agent is a polytetrafluoroethylene powder, polyethylene wax, fafty acid or silicone oil.

21. The method according to claim 16, wherein the additional polymer is a silicone rubber.

22. The method according to claim 1, wherein the article has a time-to-track of greater than about 100 minutes and an initial tracking voltage of greater than about 1,500 V, the time-to-track and the initial tracking voltage being determined in accordance with ASTM D2303.

23. The method according to claim 1, wherein the article is substantially free of anti-track fillers.

24. A method of protecting electrical equipment from damage due to tracking and spark erosion, comprising:
   (a) providing said electrical equipment with an insulating layer comprising:

(i) a silane-modified polyolefin comprising either a silane-grafted polyolefin or a silane-olefin copolymer; and
(ii) a silanol condensation catalyst;
wherein the insulating layer is moisture crosslinked to a degree such that it is softened but does not melt when heated to a temperature above its softening point; and
(b) exposing said equipment with said insulating layer to electrical and atmospheric conditions conducive to surface tracking.

25. The method according to claim 24, wherein said insulating layer further comprises one or more non silane-modified polyolefins.

26. The method of claim 24, wherein the insulating layer is heat shrunk during application to the electrical equipment by heat shrinking.

27. The method according to claim 24, wherein the insulating layer is substantially free of anti-track fillers.

28. An electrical insulating material suitable for high voltage applications which is resistant to tracking and spark erosion, comprising a silane-modified, moisture-crosslinked polymeric material formed by a process comprising:

(a) creating a mixture of a silane-modified polyolefin comprising either a silane-grafted polyolefin or a silane-olefin copolymer, with one or more non silane-modified polyolefins and a silanol condensation catalyst;
(b) forming the insulating material by melt extruding, or moulding, the mixture prepared in step (a); and
(c) moisture crosslinking the insulating material;
said insulating material further comprising a colorant, wherein the colorant is ferric oxide.

29. An electrical insulating material according to claim 28, wherein the insulating material is heat-shrinkable, and the process additionally comprises:

(d) stretching the insulating material produced in step (c) above its softening or melting point, and then cooling the insulating material so as to freeze it in its stretched form.

30. An electrical insulating material according to claim 28, wherein the insulating material is substantially free of anti-track fillers.

* * * * *